United States Patent
Kim

(10) Patent No.: US 7,824,301 B2
(45) Date of Patent: Nov. 2, 2010

(54) GEAR TRAIN OF AUTOMATIC TRANSMISSION FOR VEHICLES

(75) Inventor: Woo Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 12/177,317

(22) Filed: Jul. 22, 2008

(65) Prior Publication Data

US 2009/0209386 A1     Aug. 20, 2009

(30) Foreign Application Priority Data

Feb. 20, 2008    (KR) .................. 10-2008-0015511

(51) Int. Cl.
*F16H 3/62*     (2006.01)
(52) U.S. Cl. .................................... 475/275
(58) Field of Classification Search ............ None
See application file for complete search history.

(56) References Cited

U.S. PATENT DOCUMENTS

| | | | |
|---|---|---|---|
| 7,416,508 B1 * | 8/2008 | Carey et al. ........ | 475/275 |
| 7,416,509 B1 * | 8/2008 | Carey et al. ........ | 475/275 |
| 2009/0291800 A1 * | 11/2009 | Jang et al. ......... | 475/275 |
| 2009/0312139 A1 * | 12/2009 | Jang et al. ......... | 475/275 |
| 2009/0312140 A1 * | 12/2009 | Jang et al. ......... | 475/275 |

FOREIGN PATENT DOCUMENTS

JP     2002-013599 A     1/2002

\* cited by examiner

*Primary Examiner*—Dirk Wright
(74) *Attorney, Agent, or Firm*—Morgan, Lewis & Bockius LLP

(57) ABSTRACT

A gear train in an automatic transmission for vehicles may include: a first planetary gear set outputting reduced and same rotational speeds through two pathways by using torque received from an input shaft through one input pathway; a second planetary gear set outputting reversed and same outputs by using the reduced rotational speed from the first planetary gear set, and outputting an increased input when the reduced and same rotational speeds are simultaneous inputted from the first planetary gear set; and a third planetary gear set outputting six forward speeds and one reverse speed by using the outputs from the second planetary gear set and torque from the input shaft.

14 Claims, 3 Drawing Sheets

FIG. 2

| | C1 | C2 | C3 | C4 | B1 | B2 | F | shift ratio |
|---|---|---|---|---|---|---|---|---|
| D1 | ● | | | | ○ | | ● | 4.642 |
| D2 | ● | | | | | ● | | 2.578 |
| D3 | ● | ● | | | | | | 1.448 |
| D4 | ● | | ● | | | | | 1.000 |
| D5 | ● | | | ● | | | | 0.850 |
| D6 | | | ● | ● | | | | 0.776 |
| REV | | | ● | | ● | | | -3.549 |

US 7,824,301 B2

GEAR TRAIN OF AUTOMATIC TRANSMISSION FOR VEHICLES

CROSS-REFERENCE TO RELATED APPLICATION

This application claims priority to and the benefit of Korean Patent Application No. 10-2008-0015511 filed in the Korean Intellectual Property Office on Feb. 20, 2008, the entire contents of which are incorporated herein by reference.

BACKGROUND OF THE INVENTION (a) Field of the Invention

The present invention relates to a gear train of an automatic transmission for vehicles that achieves six forward speeds by using three planetary gear sets, four clutches, two brakes, and one one-way clutch.

(b) Description of the Related Art

A typical shift mechanism of an automatic transmission utilizes a combination of a plurality of planetary gear sets. A power train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economic fuel mileage and better performance. For that reason, an automatic transmission that is able to realize more shift speeds is under continuous investigation.

In addition, with the same number of speeds, features of a power train, such as durability, efficiency in power transmission, and size, depend a lot on the layout of the combined planetary gear sets. Therefore, designs for a combining structure of a power train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a gear train of an automatic transmission for vehicles having advantages of improving power delivery performance and fuel mileage as a consequence of six forward speeds and one reverse speed being achieved by using three simple planetary gear sets, four clutches, two brakes, and one one-way clutch.

A gear train of an automatic transmission for vehicles according to an exemplary embodiment of the present invention may include: a first planetary gear set being a simple planetary gear set provided with three rotational members, wherein a first rotational member is always operated as a fixed member, a second rotational member reduces a rotational speed of an input shaft to a reduced rotational speed and forms a first intermediate output pathway where the reduced rotational speed is outputted, and a third rotational member is directly connected to the input shaft and forms a second intermediate output pathway where a rotational speed that is the same as the rotational speed of the input shaft is outputted; a second planetary gear set being a simple planetary gear set provided with three rotational members, wherein a fourth rotational member is directly connected to the second rotational member, a fifth rotational member is selectively connected to the third rotational member and is operated as a variable fixed member, and a sixth rotational member forms a third intermediate output pathway; and a third planetary gear set being a simple planetary gear set provided with three rotational members, wherein a seventh rotational member is directly connected to the sixth rotational member, an eighth rotational member is operated as a final output member, and a ninth rotational member is selectively connected to the input shaft IS or the seventh rotational member.

The first planetary gear set may be a double pinion planetary gear set, where the first rotational member is a first sun gear, the second rotational member is a first ring gear R1, and the third rotational member is a first planet carrier; the second planetary gear set may be a single pinion planetary gear set where the fourth rotational member is a second sun gear, the fifth rotational member is a second planet carrier, and the sixth rotational member is a second ring gear; and the third planetary gear set may be a single pinion planetary gear set where the seventh rotational member is a third ring gear, the eighth rotational member is a third planet carrier, and the ninth rotational member is a third sun gear.

The first, second, and third planetary gear sets may be combined by using four clutches, two brakes, and one one-way clutch, wherein the first rotational member is directly connected to a transmission housing, the third rotational member is directly connected to the input shaft, the second rotational member is directly connected to the fourth rotational member, the sixth rotational member is directly connected to the seventh rotational member, and the eighth rotational member is directly connected to an output shaft, and wherein the input shaft is selectively connected to the ninth rotational member by interposing a first clutch, the fifth rotational member is selectively connected to the sixth rotational member by interposing a second clutch, the seventh rotational member is selectively connected to the ninth rotational member by interposing a third clutch, the third rotational member is selectively connected to the fifth rotational member by interposing a fourth clutch, the fifth rotational member is selectively connected to the transmission housing by interposing a first brake and a one-way clutch disposed in parallel with each other, and the sixth rotational member is selectively connected to the transmission housing by interposing a second brake.

The first clutch may be disposed in a rear side of the third planetary gear set, the second and third clutches may be disposed between the second and third planetary gear sets, the fourth clutch may be disposed between the first and second planetary gear sets, and the one-way clutch and the first and second brakes may be disposed at an exterior side of the second planetary gear set, wherein the second clutch may be disposed close to the second planetary gear set and the third clutch may be disposed close to the third planetary gear set.

The first clutch and the one-way clutch may be operated at a first forward speed, the first clutch and the second brake may be operated at a second forward speed, the first clutch and the second clutch may be operated at a third forward speed, the first clutch and the third clutch may be operated at a fourth forward speed, the first clutch and the fourth clutch may be operated at a fifth forward speed, the third clutch and the fourth clutch may be operated at a sixth forward speed, and the third clutch and the first brake may be operated at a reverse speed.

BRIEF DESCRIPTION OF THE DRAWINGS

FIG. 2 is an operational chart for a gear train according to an exemplary embodiment of the present invention.

DETAILED DESCRIPTION OF THE EMBODIMENTS

Hereinafter, an exemplary embodiment of the present invention will be described in detail with reference to the accompanying drawings.

Figure 1:
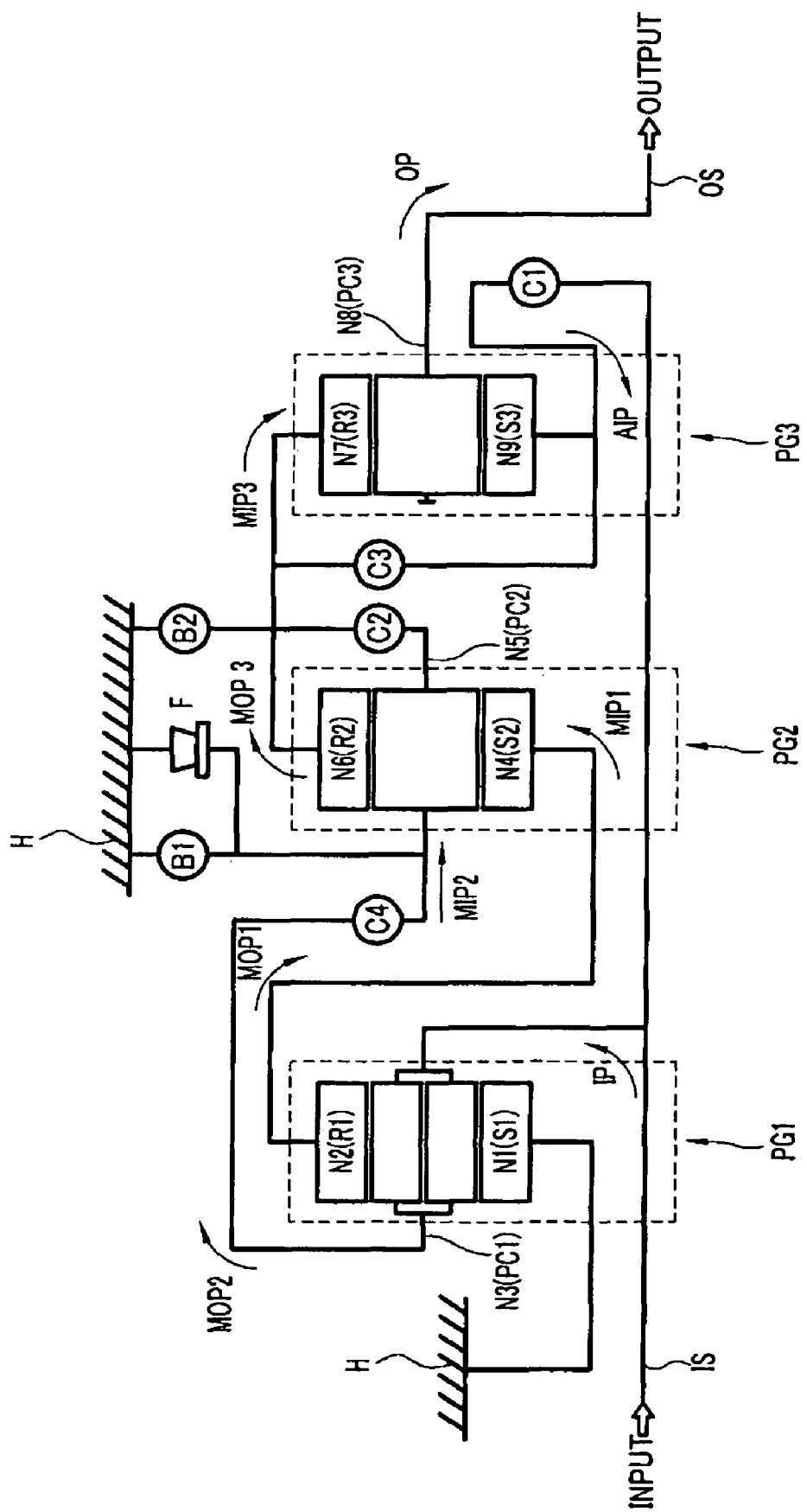
FIG. 1 is a schematic diagram of a gear train according to an exemplary embodiment of the present invention.

FIG. 1 is a schematic diagram of a gear train according to an exemplary embodiment of the present invention. As shown in FIG. 1, a gear train according to an exemplary embodiment of the present invention includes first, second, and third planetary gear sets PG1, PG2, and PG3 disposed concentrically, clutch means provided with four clutches C1, C2, C3, and C4, brake means provided with two brakes B1 and B2, and one one-way clutch F.

Accordingly, an input rotational speed transmitted from an input shaft IS is changed by passing through the first, second, and third planetary gear sets PG1, PG2, and PG3, and a changed rotational speed is outputted through an output shaft OS. The first, second, and third planetary gear sets PG1, PG2, and PG3 are disposed in a sequence of the first planetary gear set PG1, the second planetary gear set PG2, and the third planetary gear set PG3 from an engine.

The input shaft IS is an input member and is a turbine shaft of a torque converter. Torque transmitted from a crankshaft of the engine is supplied to the input shaft IS through the torque converter. The output shaft OS is an output member, and torque of the output shaft OS is transmitted to a differential apparatus through an output gear (not shown) and drives a driving wheel.

The first planetary gear set PG1 is a double pinion planetary gear set, and includes a first rotational member N1 of a first sun gear S1, a second rotational member N2 of a first ring gear R1, and a third rotational member N3 of a first planet carrier PC1.

In addition, the first rotational member N1 (the first sun gear S1) is directly connected to a transmission housing H and is always operated as a fixed member, the second rotational member N2 (the first ring gear R1) forms a first intermediate output pathway MOP1 where a reduced rotational speed is outputted, and the third rotational member N3 (the first planet carrier PC1) is directly connected to the input shaft IS so as to form an input pathway IP and form a second intermediate output pathway MOP2 where a rotational speed that is the same as an input rotational speed is outputted.

Accordingly, the input rotational speed transmitted from the input shaft IS through the input pathway IP is changed to reduced and same rotational speeds. The reduced rotational speed is outputted through the first intermediate output pathway MOP1, and the same rotational speed is outputted through the second intermediate output pathway MOP2.

The second planetary gear set PG2 is a single pinion planetary gear set, and includes a fourth rotational member N4 of a second sun gear S2, a fifth rotational member N5 of a second planet carrier PC2, and a sixth rotational member N6 of a second ring gear R2.

In addition, the fourth rotational member N4 (the second sun gear S2) forms a first intermediate input pathway MIP1 directly connected to the first intermediate output pathway MOP1, the fifth rotational member N5 (the second planet carrier PC2) forms a second intermediate input pathway MIP2 selectively connected to the second intermediate output pathway MOP2 by fourth clutch C4 and is selectively connected to the transmission housing H by a first brake B1 so as to be operated as a selective fixed member, and the sixth rotational member N6 (the second ring gear R2) forms a third intermediate output pathway MOP3 where the reduced and same rotational speeds transmitted respectively from the first and second intermediate input pathways MIP1 and MIP2 are selectively changed into reverse, same, and increased outputs and the reverse, same, and increased outputs are outputted, and is selectively connected to the transmission housing H by a second brake B2 so as to be operated as a selective fixed member.

The fifth rotational member N5 (the second planet carrier PC2) and the sixth rotational member N6 (the second ring gear R2) are selectively connected to each other such that the second planetary gear set PG2 may selectively become a lock state.

Accordingly, the reverse and the same outputs are outputted through the third intermediate output pathway MOP3 by using the reduced rotational speed of the first intermediate output pathway MOP1 received through the first intermediate input pathway MIP1, and the increased output is outputted through the third intermediate output pathway MOP3 by using the reduced rotational speed of the first intermediate output pathway MOP1 and the same rotational speed of the second intermediate output pathway MOP2 received respectively through the first intermediate input pathway MIP1 and the second intermediate input pathway MIP2.

The third planetary gear set PG3 is a single pinion planetary gear set, and includes a seventh rotational member N7 of a third ring gear R3, an eighth rotational member N8 of a third planet carrier PC3, and a ninth rotational member N9 of a third sun gear S3.

In addition, the seventh rotational member N7 (the third ring gear R3) forms a third intermediate input pathway MIP3 so as to receive the outputs from the third intermediate output pathway MOP3, the eighth rotational member N8 (the third planet carrier PC3) forms a final output pathway OP so as to always be operated as a final output member, and the ninth rotational member N9 (the third sun gear S3) is selectively connected to the input shaft IS by a first clutch C1 so as to form a variable input pathway AIP.

The seventh rotational member N7 (the third ring gear R3) and the ninth rotational member N9 (the third sun gear S3) are selectively connected to each other by a third clutch C3 such that the third planetary gear set PG3 may selectively become a lock state.

The input rotational speed of the input shaft IS received through the variable input pathway AIP, and the outputs received through the third intermediate input pathway MIP3 is changed into six forward speeds and one reverse speed, and the six forward speeds and the one reverse speed are outputted through the final output pathway OP.

The gear train according to an exemplary embodiment of the present invention is formed by combining the first planetary gear set PG1 provided with the first, second, and third rotational members N1, N2, and N3, the second planetary gear set PG2 provided with the fourth, fifth, and sixth rotational members N4, N5, and N6, and the third planetary gear set PG3 provided with the seventh, eighth, and ninth rotational members N7, N8, and N9.

The first rotational member N1 is directly connected to the transmission housing H, the third rotational member N3 is directly connected to the input shaft IS, the second rotational member N2 and the fourth rotational member N4 are directly connected to each other, the sixth rotational member N6 and the seventh rotational member N7 are directly connected to each other, and the eighth rotational member N8 is directly connected to the output shaft OS.

In addition, the input shaft IS is selectively connected to the ninth rotational member N9 by interposing a first clutch C1, the fifth rotational member N5 is selectively connected to the sixth rotational member N6 by interposing a second clutch C2, the seventh rotational member N7 is selectively connected to the ninth rotational member N9 by interposing a third clutch C3, the third rotational member N3 is selectively connected to the fifth rotational member N5 by interposing a fourth clutch C4, the fifth rotational member N5 is selectively connected to the transmission housing H by interposing a first brake B1 and a one-way clutch F disposed in parallel with each other, and the sixth rotational member N6 is selectively connected to the transmission housing H by interposing a second brake B2.

The first, second, third, and fourth clutches C1, C2, C3, and C4 and the first and second brakes B1 and B2 may include a plurality of disks that are engaged by frictional force applied by hydraulic pressure.

The first clutch C1 is disposed at a rear side of the third planetary gear set PG3, the second and third clutches C2 and C3 are disposed between the second and third planetary gear sets PG2 and PG3 wherein the second clutch C2 is closer to the second planetary gear set PG2 and the third clutch C3 is closer to the third planetary gear set PG3, and the fourth clutch C4 is disposed between the first and second planetary gear sets PG1 and PG2.

In addition, the first and second brakes B1 and B2 are disposed at an exterior side of the second planetary gear set PG2, and the one-way clutch F, disposed in parallel with the first brake B1, is disposed between the first and second brakes B1 and B2.

If the frictional members are dispersedly disposed, mass center may be stable, and it may be easy to form hydraulic lines through which hydraulic pressure is supplied to the frictional members.

FIG. 2 is an operational chart for a gear train according to an exemplary embodiment of the present invention. As shown in FIG. 2, each speed is achieved by operations of two frictional members according to the present invention.

That is, the first clutch C1 and the one-way clutch F are operated at a first forward speed D1, the first clutch C1 and the second brake B2 are operated at a second forward speed D2, the first clutch C1 and the second clutch C2 are operated at a third forward speed D3, the first clutch C1 and the third clutch C3 are operated at a fourth forward speed D4, the first clutch C1 and the fourth clutch C4 are operated at a fifth forward speed D5, the third clutch C3 and the fourth clutch C4 are operated at a sixth forward speed D6, and the third clutch C3 and the first brake B1 are operated at a reverse speed REV.

Figure 3:
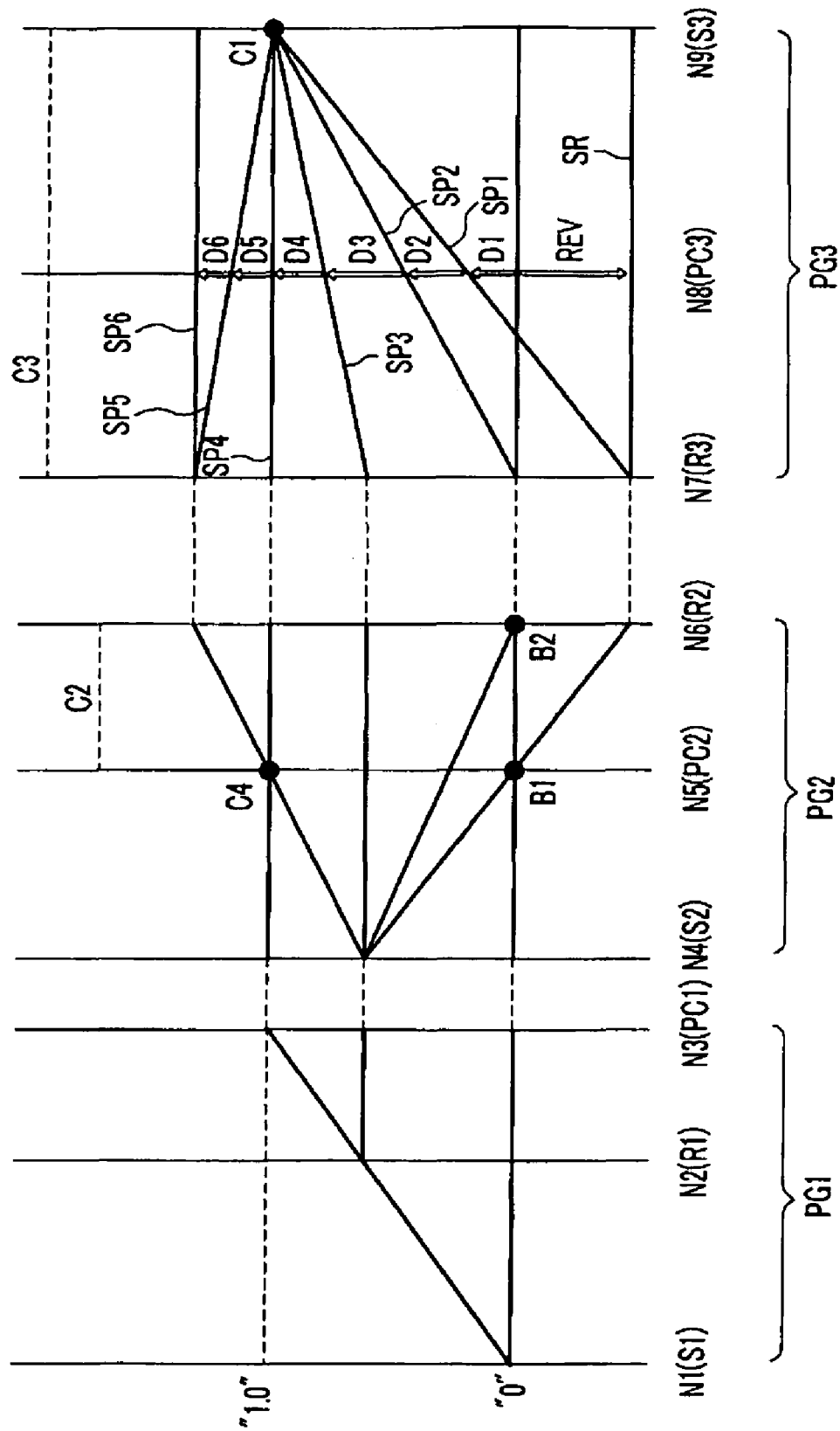
FIG. 3 is a lever diagram showing shifting processes from a first forward speed to a sixth forward speed and one reverse speed in a gear train according to an exemplary embodiment of the present invention.

FIG. 3 is a lever diagram showing shifting processes from a first forward speed to a sixth forward speed and one reverse speed in a gear train according to an exemplary embodiment of the present invention. In FIG. 3, a lower horizontal line represents "0" rotational speed, and an upper horizontal line represents "1.0" rotational speed that is the same as the rotational speed of the input shaft IS.

Three vertical lines of the first planetary gear set PG1 respectively represent the first rotational member N1 (the first sun gear S1), the second rotational member N2 (the first ring gear R1), and the third rotational member N3 (the first planet carrier PC1) sequentially from the left in the drawing, and a distance between them is determined according to a gear ratio (teeth number of sun gear/teeth number of ring gear) of the first planetary gear set PG1.

Three vertical lines of the second planetary gear set PG2 respectively represent the fourth rotational member N4 (the second sun gear S2), the fifth rotational member N5 (the second planet carrier PC2), and the sixth rotational member N6 (the second ring gear R2) sequentially from the left in the drawing, and a distance between them is determined according to a gear ratio (teeth number of sun gear/teeth number of ring gear) of the second planetary gear set PG2.

Three vertical lines of the third planetary gear set PG3 respectively represent the seventh rotational member N7 (the third ring gear R3), the eighth rotational member N8 (the third planet carrier PC3) connected to output shaft, and the ninth rotational member N9 (the third sun gear S3) sequentially from the left in the drawing, and a distance between them is determined according to a gear ratio (teeth number of sun gear/teeth number of ring gear) of the third planetary gear set PG3. The lever diagram is well known to a person of ordinary skill in the art, and detailed descriptions will be accordingly omitted.

Hereinafter, shifting processes in the gear train according to the exemplary embodiment of the present invention will be described in detail.

[First Forward Speed]

As shown in FIG. 2, the first clutch C1 and the one-way clutch F are operated at the first forward speed D1.

In this case, as shown in FIG. 3, in a state that the input rotational speed is transmitted to the third rotational member N3 of the first planetary gear set PG1 through the input pathway IP, the first rotational member N1 is operated as the fixed member. Thus, the reduced rotational speed is generated at the second rotational member N2, forming the first intermediate output pathway MOP1 and is transmitted to the fourth rotational member N4 of the second planetary gear set PG2 through the first intermediate input pathway MIP1.

In a state in which the reduced rotational speed is transmitted to the fourth rotational member N4 of the second planetary gear set PG2, the fifth rotational member N5 is operated as the fixed member by an operation of the one-way clutch F. The reverse output of the sixth rotational member N6 is transmitted to the seventh rotational member N7 of the third planetary gear set PG3 through the third intermediate output pathway MOP3 and the third intermediate input pathway MIP3.

In a state in which the input rotational speed is transmitted to the ninth rotational member N9 of the third planetary gear set PG3 through the variable input pathway AIP by an operation of the first clutch C1, the reverse output is transmitted to the seventh rotational member N7. Therefore, a first shift line SP1 connecting the seventh rotational member N7 with the ninth rotational member N9 is formed and the first forward speed D1 is outputted to the eighth rotational member N8 that is the output member.

[Second Forward Speed]

In a state of the first forward speed D1, the one-way clutch F is not operated but the second brake B2 is operated at the second forward speed D2.

In this case, the reduced rotational speed of the second rotational member N2 is transmitted to the fourth rotational member N4 of the second planetary gear set PG2 through the first intermediate output pathway MOP1 and the first intermediate input pathway MIP1, and is the same as the first forward speed D1. In addition, the sixth rotational member N6 is operated as the fixed member by an operation of the second brake B2.

The seventh rotational member N7 of the third planetary gear set PG3 that is directly connected to the sixth rotational member N6 through the third intermediate input pathway MIP3 is operated as the fixed member, and the input rotational speed is transmitted to the ninth rotational member N9 through the variable input pathway AIP by an operation of the first clutch C1. Therefore, a second shift line SP2 connecting the seventh rotational member N7 and the ninth rotational member N9 is formed and the second forward speed D2 is outputted to the eighth rotational member N8 that is the output member.

That is, the first and second planetary gear sets PG1 and PG2 are not related to a shift to the second forward speed D2, but torque transmitted to the ninth rotational member N9 of the third planetary gear set PG3 is reduced and the shift to the second forward speed D2 is achieved.

[Third Forward Speed]

As shown in FIG. 2, in a state of the second forward speed D2, the second brake B2 is released and the second clutch C2 is operated at the third forward speed D3.

In this case, the reduced rotational speed of the second rotational member N2 is transmitted to the fourth rotational member N4 of the second planetary gear set PG2 through the first intermediate output pathway MOP1 and the first intermediate input pathway MIP1. At this time, the second planetary gear set PG2 becomes the lock state by an operation of the second clutch C2, and the output that is the same as the reduced rotational speed is transmitted to the seventh rotational member N7 of the third planetary gear set PG3 through the third intermediate input pathway MIP3.

In a state in which the input rotational speed of input shaft IS is transmitted to the ninth rotational member N9 of the third planetary gear set PG3 through the variable input pathway AIP, the reduced rotational speed is transmitted to the seventh rotational member N7 through the third intermediate input pathway MIP3. Therefore, a third shift line SP3 connecting the seventh rotational member N7 with the ninth rotational member N9 is formed and the third forward speed D3 is outputted to the eighth rotational member NS that is the output member.

[Fourth Forward Speed]

As shown in FIG. 2, in a state of the third forward speed D3, the second clutch C2 is released and the third clutch C3 is operated at the fourth forward speed D4.

In this case, the input rotational speed is transmitted to the ninth rotational member N9 through the variable input pathway AIP by an operation of the first clutch C1, and the third planetary gear set PG3 becomes the lock state by an operation of the third clutch C3. Thus, a fourth shift line SP4 is formed and the fourth forward speed D4 is outputted to the eighth rotational member N8 that is the output member.

That is, because of the lock state of the third planetary gear set PG3, the input rotational speed is directly outputted and the shift to the fourth forward speed D4 is achieved.

[Fifth Forward Speed]

As shown in FIG. 2, in a state of the fourth forward speed D4, the third clutch C3 is released and the fourth clutch C4 is operated at the fifth forward speed D5.

In this case, the reduced rotational speed of the second rotational member N2 is transmitted to the fourth rotational member N4 of the second planetary gear set PG2 through the first intermediate output pathway MOP1 and the first intermediate input pathway MIP1, and the same rotational speed of the third rotational member N3 is transmitted to the fifth rotational member N5 of the second planetary gear set PG2 through the second intermediate output pathway MOP2 and the second intermediate input pathway MIP2 by an operation of the fourth clutch C4.

At this time, the increased output is generated at the sixth rotational member N6 by the reduced and same rotational speeds input respectively to the fourth rotational member N4 and the fifth rotational member N5 of the second planetary gear set PG2. The increased output is transmitted to the seventh rotational member N7 of the third planetary gear set PG3 through the third intermediate output pathway MOP3 and the third intermediate input pathway MIP3. In addition, the input rotational speed of the input shaft IS is transmitted to the ninth rotational member N9 of the third planetary gear set PG3 through the variable input pathway AIP by an operation of the first clutch C1. Therefore, a fifth shift line SP5 connecting the seventh rotational member N7 with the ninth rotational member N9 is formed and the fifth forward speed D5 is outputted to the eighth rotational member N8 that is the output member.

That is, the reduced and same rotational speeds of the first planetary gear set PG1 are transmitted to the second planetary gear set PG2 through the first and second intermediate output pathways MOP1 and MOP2, and the second planetary gear set PG2 generates the increased output. After that, the fifth forward speed D5 is achieved by the increased output and the input rotational speed transmitted to the third planetary gear set PG3.

[Sixth Forward Speed]

As shown in FIG. 2, in a state of the fifth forward speed D5, the first clutch C1 is released and the third clutch C3 is operated at the sixth forward speed D6.

In this case, the reduced rotational speed of the second rotational member N2 is transmitted to the fourth rotational member N4 of the second planetary gear set PG2 through the first intermediate output pathway MOP1 and the first intermediate input pathway MIP1, and the same rotational speed of the third rotational member N3 is transmitted to the fifth rotational member N5 of the second planetary gear set PG2 through the second intermediate output pathway MOP2 and the second intermediate input pathway MIP2 by an operation of the fourth clutch C4.

At this time, the increased output is generated at the sixth rotational member N6 by the reduced and same rotational speeds input respectively to the fourth rotational member N4 and the fifth rotational member N5 of the second planetary gear set PG2. The increased output is transmitted to the seventh rotational member N7 of the third planetary gear set PG3 through the third intermediate output pathway MOP3 and the third intermediate input pathway MIP3.

In addition, the third planetary gear set PG3 becomes the lock state by an operation of the third clutch C3. Therefore, a sixth shift line SP6 is formed and the sixth forward speed D6 is outputted to the eighth rotational member NS that is the output member.

That is, the reduced and same rotational speeds of the first planetary gear set PG1 are transmitted to the second planetary gear set PG2 through the first and second intermediate output pathways MOP1 and MOP2, and the second planetary gear set PG2 generates the increased output. After that, the increased output is transmitted to the third planetary gear set PG3. Because of the lock state of the third planetary gear set PG3, the increased output is directly outputted and the shift to the sixth forward speed D6 is achieved.

[Reverse Speed]

As shown in FIG. 2, the third clutch C3 and the first brake B1 are operated at the reverse speed REV.

In this case, as shown in FIG. 3, in a state in which the input rotational speed is transmitted to the third rotational member N3 of the first planetary gear set PG1 through the input pathway IP, the first rotational member N1 is operated as the fixed member. Thus, the reduced rotational speed is generated at the second rotational member N2 and is transmitted to the fourth rotational member N4 of the second planetary gear set PG2 through the first intermediate output pathway MOP1 and the first intermediate input pathway MIP1.

In a state in which the reduced rotational speed is transmitted to the fourth rotational member N4 of the second planetary gear set PG2, the fifth rotational member N5 is operated as the fixed member by an operation of the first brake B1. The reverse output is generated at the sixth rotational member N6 and is transmitted to the seventh rotational member N7 of the third planetary gear set PG3 through the third output pathway MOP3 and the third intermediate input pathway MIP3.

In addition, a reverse shift line SR is formed as a consequence of the third planetary gear set PG3 becoming the lock state by an operation of the third clutch C3, and the reverse speed REV is outputted to the eighth rotational member N8 that is the output member.

If teeth numbers of the first sun gear S1, the first ring gear R1, the second sun gear S2, the second ring gear R2, the third sun gear S3, and the third ring gear R3 are 46, 91, 49, 86, 64, and 101, respectively, according to the gear train of an exemplary embodiment of the present invention, shift ratios of the first, second, third, fourth, fifth, and sixth forward speeds D1, D2, D3, D4, D5, and D6 and the reverse speed REV are 4.642, 2.578, 1.448, 1.000, 0.850, 0.776, and 3.549 respectively.

As described above, power delivery performance and fuel mileage may be improved as a consequence of achieving six forward speeds and one reverse speed by using three simple planetary gear sets, four clutches, two brakes, and one one-way clutch.

In addition, hydraulic lines may be simplified by dispersedly disposing frictional members.

In addition, capacity of a hydraulic pump may be decreased and control efficiency of hydraulic pressure may be improved as a consequence of a shift to a target speed being achieved by operating only two frictional members.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gear train of an automatic transmission for vehicles, comprising:
   a first planetary gear set being a simple planetary gear set provided with three rotational members, wherein a first rotational member is always operated as a fixed member, a second rotational member reduces a rotational speed of an input shaft to a reduced rotational speed and forms a first intermediate output pathway where the reduced rotational speed is outputted, and a third rotational member is directly connected to the input shaft and forms a second intermediate output pathway where a rotational speed that is the same as the rotational speed of the input shaft is outputted;
   a second planetary gear set being a simple planetary gear set provided with three rotational members, wherein a fourth rotational member is directly connected to the second rotational member, a fifth rotational member is selectively connected to the third rotational member and is operated as a variable fixed member, and a sixth rotational member forms a third intermediate output pathway; and
   a third planetary gear set being a simple planetary gear set provided with three rotational members, wherein a seventh rotational member is directly connected to the sixth rotational member, an eighth rotational member is operated as a final output member, and a ninth rotational member is selectively connected to the input shaft or the seventh rotational member.

2. The gear train of claim 1, wherein the first planetary gear set is a double pinion planetary gear set where the first rotational member is a first sun gear, the second rotational member is a first ring gear, and the third rotational member is a first planet carrier,
   wherein the second planetary gear set is a single pinion planetary gear set where the fourth rotational member is a second sun gear, the fifth rotational member is a second planet carrier, and the sixth rotational member is a second ring gear, and
   wherein the third planetary gear set is a single pinion planetary gear set where the seventh rotational member is a third ring gear, the eighth rotational member is a third planet carrier, and the ninth rotational member is a third sun gear.

3. The gear train of claim 2, wherein the first, second, and third planetary gear sets are combined by using four clutches, two brakes, and one one-way clutch,
   wherein the first rotational member is directly connected to a transmission housing, the third rotational member is directly connected to the input shaft, the second rotational member is directly connected to the fourth rotational member, the sixth rotational member is directly connected to the seventh rotational member, and the eighth rotational member is directly connected to an output shaft, and
   wherein the input shaft is selectively connected to the ninth rotational member by interposing a first clutch, the fifth rotational member is selectively connected to the sixth rotational member by interposing a second clutch, the seventh rotational member is selectively connected to the ninth rotational member by interposing a third clutch, the third rotational member is selectively connected to the fifth rotational member by interposing a fourth clutch, the fifth rotational member is selectively connected to the transmission housing by interposing a first brake and a one-way clutch disposed in parallel with each other, and the sixth rotational member is selectively connected to the transmission housing by interposing a second brake.

4. The gear train of claim 3, wherein the first clutch is disposed in a rear side of the third planetary gear set,
   the second and third clutches are disposed between the second and third planetary gear sets,
   the fourth clutch is disposed between the first and second planetary gear sets, and
   the one-way clutch and the first and second brakes are disposed at an exterior side of the second planetary gear set.

5. The gear train of claim 4, wherein the second clutch is disposed close to the second planetary gear set and the third clutch is disposed close to the third planetary gear set.

6. The gear train of claim 3, wherein the first clutch and the one-way clutch are operated at a first forward speed,
   the first clutch and the second brake are operated at a second forward speed,
   the first clutch and the second clutch are operated at a third forward speed,
   the first clutch and the third clutch are operated at a fourth forward speed,
   the first clutch and the fourth clutch are operated at a fifth forward speed,
   the third clutch and the fourth clutch are operated at a sixth forward speed, and
   the third clutch and the first brake are operated at a reverse speed.

7. The gear train of claim 6, wherein the first planetary gear set outputs the reduced rotational speed through the first intermediate output pathway by using the rotational speed of the input shaft,
   the second planetary gear set receives the reduced rotational speed of the first intermediate output pathway through the first intermediate input pathway, and outputs a reverse output through the third intermediate output pathway by an operation of the one-way clutch, and
   the third planetary gear set receives the rotational speed of the input shaft through the variable input pathway by an operation of the first clutch, receives the reverse output of the third intermediate output pathway through the third intermediate input pathway, and outputs the first forward speed through the final output pathway.

8. The gear train of claim 6, wherein the first planetary gear set outputs the reduced rotational speed through the first intermediate output pathway by using the rotational speed of the input shaft,
   the second planetary gear set receives the reduced rotational speed of the first intermediate output pathway through the first intermediate input pathway, and maintains the third intermediate output pathway to be stopped by an operation of the second brake, and
   the third planetary gear set receives the rotational speed of the input shaft through the variable input pathway by an operation of the first clutch, maintains the third intermediate input pathway to be stopped by the operation of the second brake, and outputs the second forward speed through the final output pathway.

9. The gear train of claim 6, wherein the first planetary gear set outputs the reduced rotational speed through the first intermediate output pathway by using the rotational speed of the input shaft,
   the second planetary gear set becomes the lock state by an operation of the second clutch in a state of receiving the reduced rotational speed of the first intermediate output pathway through the first intermediate input pathway, and outputs the reduced rotational speed through the third intermediate output pathway, and
   the third planetary gear set receives the rotational speed of the input shaft through the variable input pathway by an operation of the first clutch, receives the reduced rotational speed of the third intermediate input pathway through the third intermediate output pathway, and outputs the third forward speed through the final output pathway.

10. The gear train of claim 6, wherein the third planetary gear set becomes the lock state by an operation of the third clutch in a state of receiving the rotational speed of the input shaft by an operation of the first clutch, and outputs the fourth forward speed through the final output pathway.

11. The gear train of claim 6, wherein the first planetary gear set outputs the reduced and the same rotational speeds respectively through the first and second intermediate output pathways by using the rotational speed of the input shaft,
    the second planetary gear set receives the reduced and the same rotational speeds of the first and second intermediate output pathways respectively through the first and second intermediate input pathways, and outputs the increased output through the third intermediate output pathway, and
    the third planetary gear set receives the rotational speed of the input shaft through the variable input pathway by an operation of the first clutch, receives the increased output of the third intermediate output pathway through the third intermediate input pathway, and outputs the fifth forward speed through the final output pathway.

12. The gear train of claim 6, wherein the first planetary gear set outputs the reduced and the same rotational speeds respectively through the first and second intermediate output pathways by using the rotational speed of the input shaft,
    the second planetary gear set receives the reduced and the same rotational speeds of the first and second intermediate output pathways respectively through the first and second intermediate input pathways, and outputs the increased output through the third intermediate output pathway, and
    the third planetary gear set becomes the lock state by an operation of the third clutch, and outputs the sixth forward speed through the final output pathway by using the increased output transmitted through the third intermediate input pathway.

13. The gear train of claim 6, wherein the first planetary gear set outputs the reduced rotational speed through the first intermediate output pathway by using the rotational speed of the input shaft,
    the second planetary gear set receives the reduced rotational speed of the first intermediate output pathway through the first intermediate input pathway, and outputs a reverse output through the third intermediate output pathway by an operation of the first brake, and
    the third planetary gear set becomes the lock state by an operation of the third clutch, and outputs the reverse speed through the final output pathway by using the reverse output transmitted through the third intermediate input pathway.

14. A gear train of an automatic transmission for vehicles where a first planetary gear set of a double pinion planetary gear set, a second planetary gear set of a single pinion planetary gear set, and a third planetary gear set of a single pinion planetary gear set are combined,
    wherein a first sun gear of the first planetary gear set is directly connected to a transmission housing,
    a first planet carrier of the first planetary gear set is directly connected to an input shaft,
    a first ring gear of the first planetary gear set is directly connected to a second sun gear of the second planetary gear set,
    a second ring gear of the second planetary gear set is directly connected to a third ring gear of the third planetary gear set,
    a third planet carrier of the third planetary gear set is directly connected to an output shaft,
    the input shaft is selectively connected to a third planet carrier of the third planetary gear set by interposing a first clutch, a second planet carrier and the second ring gear of the second planetary gear set are selectively connected to each other by interposing a second clutch, the third ring gear of the third planetary gear set is selectively connected to the third sun gear by interposing a third clutch, the first planet carrier of the first planetary gear set is selectively connected to the second planet carrier of the second planetary gear set by interposing a fourth clutch, the second planet carrier of the second planetary gear set is selectively connected to the transmission housing by interposing a first brake B1 or a one-way clutch, disposed in parallel with each other, and the second ring gear of the second planetary gear set is selectively connected to the transmission housing by interposing a second brake.

* * * * *